United States Patent [19]

Jones

[11] 4,309,842
[45] Jan. 12, 1982

[54] PORTABLE HERBICIDE AND INSECTICIDE APPLICATOR

[76] Inventor: James R. Jones, P.O. Box 313, Cross Plains, Tex. 76443

[21] Appl. No.: 81,038

[22] Filed: Oct. 1, 1979

[51] Int. Cl.³ .......................................... A01M 21/00
[52] U.S. Cl. ...................................................... 47/1.5
[58] Field of Search .......... 47/1, 1.5, 1.44, 1.7, 47/48.5; 239/145, 44–51, 159, 542; 401/286–291; 119/156, 157

[56] References Cited

U.S. PATENT DOCUMENTS

| | | | |
|---|---|---|---|
| 865,351 | 9/1907 | Bierley | 401/289 |
| 1,484,027 | 2/1924 | Jacobs | 401/285 |
| 1,921,901 | 8/1933 | Anderson | 119/157 |
| 2,471,949 | 5/1949 | Gilowitz | 239/44 |
| 3,101,072 | 8/1963 | Smith | 119/156 |
| 3,198,396 | 8/1965 | Bailey | 47/1.5 X |
| 4,187,638 | 2/1980 | Hardy et al. | 47/1.5 |

FOREIGN PATENT DOCUMENTS 154123  9/1904  Fed. Rep. of Germany ...... 401/290

*Primary Examiner*—James R. Feyrer
*Attorney, Agent, or Firm*—Richards, Harris & Medlock

[57] ABSTRACT

A portable hand-held herbicide and insecticide applicator is comprised of a hollow tubular frame including a handle section and a pair of extended spaced prong sections, forming a liquid reservoir conduit having spaced discharge ports between which extends an absorptive rope mop in wicking relation with and saturated by liquid in the reservoir conduit.

3 Claims, 6 Drawing Figures

PORTABLE HERBICIDE AND INSECTICIDE APPLICATOR

TECHNICAL FIELD

The present invention relates to herbicide and insecticide applicators, particularly of the non-spray type. In the case of herbicide, this avoids the danger of spray drift to valuable trees, ornamental shrubs, existing crops, etc. In the case of insecticide applied to livestock, this avoids spray drift contamination of feed or water.

BACKGROUND

One type of known non-spray applicator is employed with farm machinery pulled by a tractor. The applicator includes a transverse horizontal hollow tubular member spaced a short distance above the ground and containing the liquid to be applied. The member has a plurality of apertures formed therethrough with a plurality of rope-like members extending short arcuate distances between apertures and engaging the arcuate underside of the tubular member. These short arcuate rope segments on the outer surface of the member are saturated by the liquid within the member. As the applicator is pulled by the tractor, the tubular member is dragged over upstanding weeds and the like and the saturated rope segments brush the herbicidal liquid thereon.

While prior non-spray applicators have worked well for their intended purposes, a need has arisen for a lightweight, portable unit suitable for handling by a single person to apply herbicide, insecticide or the like.

SUMMARY OF THE INVENTION

The present invention relates to an improved non-spray type applicator. The invention provides portability and selectively directed application of liquid together with speed and ease of use. A rope-like mop element is mounted and supported at the end of a portable handle and is in wicking relation with a discharge port of self-contained liquid conduit means for saturating the mop. The herbicide or insecticide is applied in a brush-like manner by the saturated rope-like mop.

The rope mop is advantageous in close quarters for spot removal of weeds and the like without accidentally also applying herbicide to closely adjacent crops or shrubs. Removal of underbrush and weeds from orchards, low hanging shrubs and trees is facilitated without danger of applying the herbicide to low hanging branches and the like. Edging along fences, sidewalks or borders is fast, easy and specifically and accurately directed. Application of insecticide to livestock is fast and efficient, and an significant improvement over spraying, sponging or the like.

In one particularly advantageous form, the rope-like mop element is isolated from the remaining structure of the applicator except at its ends. This isolated rope mop enables both the front and back side of weeds to be brushed without the operator changing position or without the operator having to pull the weeds back from the house or wall in order to apply the herbicide thereto. This further enables the user to rub weeds upwardly starting closely adjacent the root so as to get maximized coverage along the length of the weed. Furthermore, since the root end in anchored, the weed is stretched, not buckled, and this further maximizes total surface coverage. The applicator may be used in extremely tight places limited only by the thickness of the rope, while still assuring application to only the desired areas.

In the preferred embodiment, a hollow tubular frame is employed having a handle section and a pair of space extended prong sections. A rope mop extends between the prong sections in wicking relation with discharge ports thereat so as to be saturated by the liquid contained in the tubular frame reservoir. The handle section may extend from centrally between the prong sections to provide a fork-like frame member or the handle may extend obtusely from adjacent one of the prong sections to provide a hockey-stick-like frame member.

In other aspects of the invention, a wheeled version may be employed providing increased tank capacity. Different rope mountings and arrangements may be employed, including a rope element extending contiguous with and parallel to or spirally wound around a liquid conduit frame section having at least one discharge port. The rope element may have a shield, such as a concentric helical spring, for protecting the rope in rough environments, such as barbs and the like.

DESCRIPTION OF THE PREFERRED EMBODIMENT

Figure 1:
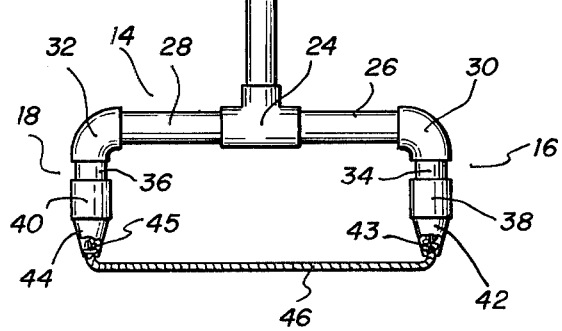
FIG. 1 is a front elevation view of the preferred embodiment of an applicator constructed in accordance with the invention.

Referring to FIG. 1, there is shown a portable herbicide and insecticide applicator generally designated by the reference character 10. The applicator is a fork-like member having a handle section 12 joined to the midportion of a bight section 14. Extended spaced prong sections 16 and 18 are joined to the outer ends of bight section 14. There is thus formed a frame having a handle section 12 and a pair of extended spaced sections 16 and 18.

The handle section is a long hollow tubular member 20 having a removable cap 22 screwed on the upper end thereof, and connected at its other end to a T-joint 24. Hollow tubular members 26 and 28 are joined to the T-joint and extend rightwardly and leftwardly therefrom, respectively. Elbow joints 30 and 32 are mounted to the right and left ends of tubular members 26 and 28, respectively. Short hollow tubular members 34 and 36 are joined to elbows 30 and 32, respectively, and extend downwardly therefrom. Sockets 38 and 40 are joined to the lower ends of tubular members 34 and 36, respectively, and have tapered connectors 42 and 44, respectively, screwed thereinto and extending downwardly therefrom. Numerous materials are suitable for the hollow tubular members, joints, etc., such as plastic, steel, aluminum or other materials. Plastic members are used in the preferred embodiment and the non-screwed connections are by means friction interfit and PVC glue.

A mop element such as a rope 46 extends between the extended spaced sections 16 and 18 of the frame. Sockets 38 and 40 and connectors 42 and 44 may be of the chuck-type to provide grippingly tight engagement of the rope end inserted therein as the opening at the bottom of tapered connectors 42 and 44 becomes smaller as these connectors are screwed into sockets 38 and 40. The connection of rope 46 to connectors 42 and 44 should be liquid tight and substantially sealed. The ends of rope 46 should extend into hollow tubular spaced sections 16 and 18. The rope should be held tightly enough at its ends to provide a substantially taut rectilinear extension thereof. It is preferred that knots 43 and 45 be tied near each end of the rope after insertion into connectors 42 and 44 before these connectors are screwed into sockets 38 and 40. These knots insure anchoring of the rope ends and further provide an increased area for wicking absorption which in turn enhances the application flow. An alternative would be the use of a metal washer and PVC glue.

The applicator is filled with herbicide or insecticide by removing cap 22 and pouring liquid into tubular member 20, which liquid flows through the remainder of the interconnected hollow members. The frame thus comprises liquid reservoir conduit means having spaced discharge ports at extended prong sections 16 and 18 in the form of connectors 42 and 44. The liquid within the reservoir conduit means wicks through the discharge ports to saturate rope 46. This saturation may be effected from only one end, but the double end wicking saturation disclosed is preferred.

A simple modification to FIG. 1 is to employ a Y-shaped frame with spaced prong sections 16 and 18 diverging from a common junction point at the lower end of handle section 12.

In the preferred embodiment, FIG. 1, handle section 12 is four feet long, and the rope is one foot in length. The preferred rope is one-half inch diameter soft braided nylon with suitable absorption properties, such as the rope sold under the Sears & Roebuck catalog number TGAV64146. Absorption characteristics is a significant criteria in rope selection and hence a nylon rope having strands which are not wound too tight nor too thick is preferred. In the preferred embodiment, the separation between rope 46 and bight section 14 is approximately four to five inches. These recited dimensions, materials, etc., are of course only exemplary, and not a constraint of the invention.

Figure 2:
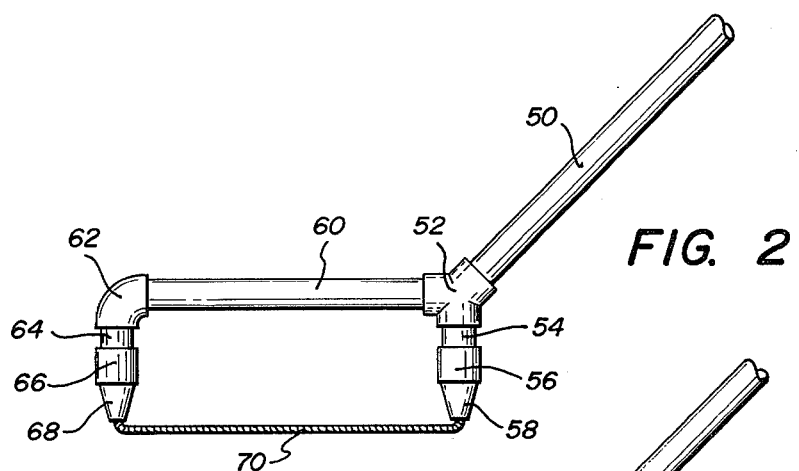
FIG. 2 shows a different handle arrangement for the applicator of FIG. 1.

FIG. 2 shown an alternate hockey-stick-like handle arrangement for the applicator of FIG. 1. FIG. 2 shows a handle 50 connected to a Y-joint 52 having a tubular member 54, a socket 56 and a tapered connector 58 extending from one leg thereof, and an elongated tubular member 60, elbow 62, tubular member 64, socket 66, and connector 68 extending from the other leg thereof, in like manner and connection as FIG. 1. Rope-like mop element 70 extends between the connectors and is saturated from both ends in wicking relation.

Figure 3:
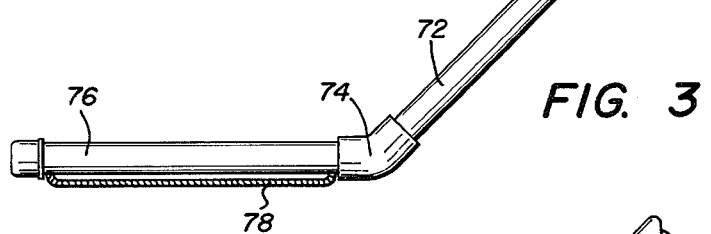
FIGS. 3 and 4 are partial front isolation views showing different rope mounting arrangements.

FIG. 3 shows a handle 72 connected to elbow joint 74 which is in turn connected to hollow tubular liquid conduit frame member portion 76 having apertures near the ends thereof for receiving the ends of rope mop 78 in wicking relation. The rope mop extends along the underside of frame section 76, generally contiguous therewith and parallel thereto.

Figure 4:
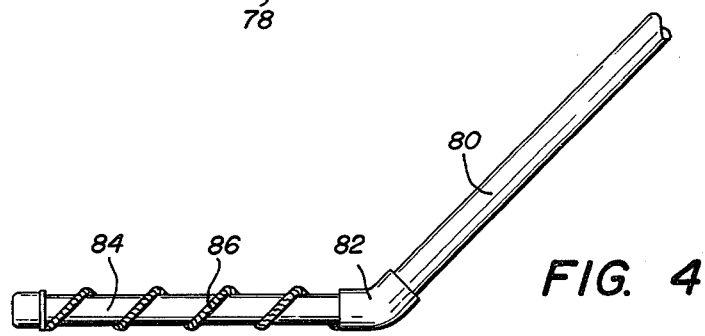

FIG. 4 shows a handle 80 connected to elbow joint 82 which is connected to hollow tubular liquid conduit frame member section 84 having rope element 86 spirally wrapped around and mounted at its ends through apertures in frame section 84 in wicking relation with the liquid therein.

Figure 5:
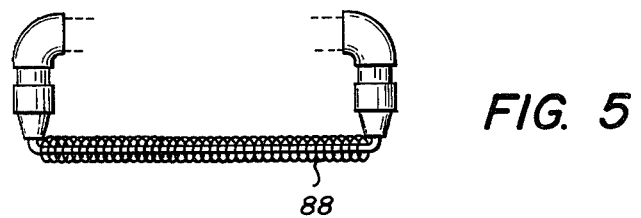
FIG. 5 is an isolated view of a rope and a protective shield in the form of a helical spring.

FIG. 5 shows a protective shield in the form of helical compression spring 88 which may be disposed concentric to the rope mop to protect the latter in rough environments such as barbs and the like.

Figure 6:
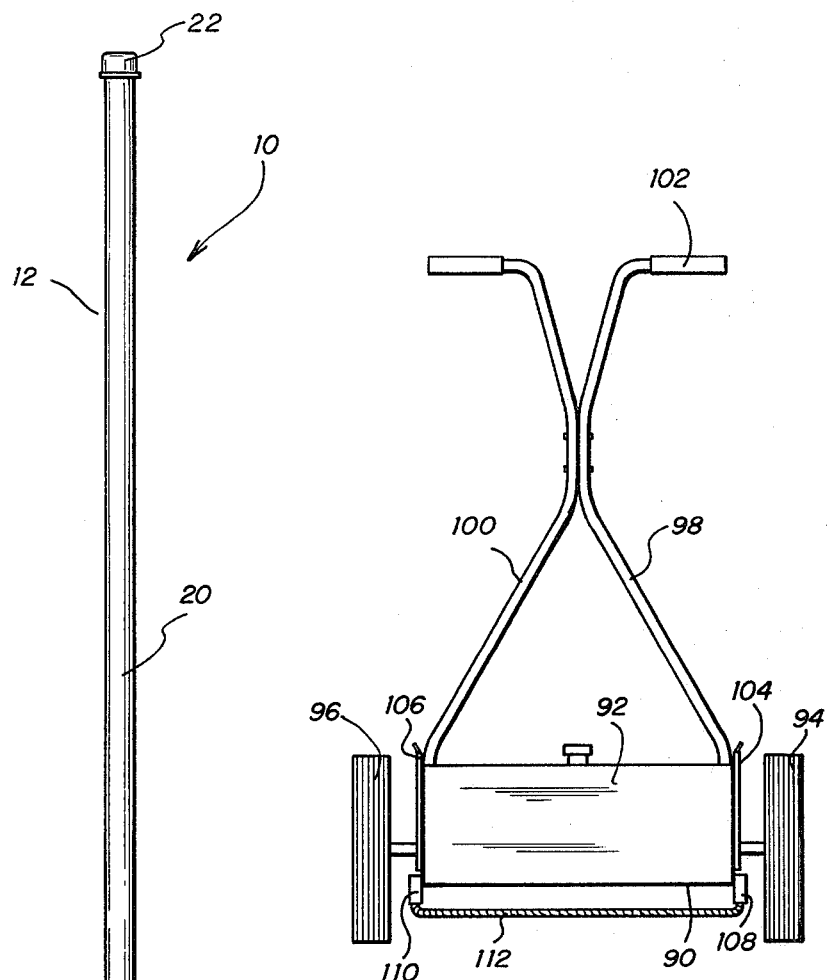
FIG. 6 is a front elevation view showing a wheeled version of the applicator.

FIG. 6 shows an alternate wheeled embodiment. This embodiment includes a frame 90 having a tank 92, a pair of wheels 94 and 96 rotatably mounted to the sides thereof, and a pair of push rods 98 and 100 with a push handle 102 at the end thereof. The wheels may include adjustable mounting means 104 and 106, such as mating detent plates, for height adjustment. The frame includes a pair of extended spaced sections 108 and 110 providing liquid conduit means having discharge ports between which extends a mop rope 112 in wicking relation. Rope 112 is spaced from the remainder of the applicator and brushes and rubs upstanding weeds, etc. as the applicator is pushed along a surface.

It is recognized that various alternatives and modifications are possible within the scope of the appended claims.

I claim:

1. A portable herbicide and insecticide applicator for selectively directed application of a herbicide or insecticide by a user comprising:
   a frame comprising a hollow tubular handle section adapted for being grasped by the user to control application of herbicide and insecticide;
   a hollow tubular bight section extending from said handle section;
   a pair of hollow prong sections interconnected to said bight section and diverging therefrom in spaced apart relation;
   said handle, bight and prong sections forming a liquid reservoir conduit means;
   each of said prong sections having a discharge port disposed at the end thereof and communicating with said conduit means;
   a rope-like element extending between said discharge ports in wicking relation with and saturated by said conduit means, said rope-like element extending rectilinearly along its longitudinal dimension and being spaced apart from said applicator for permitting herbicide and insecticide to be applied to an object between said frame and said rope-like element; and
   a helical shield surrounding said rope-like element adapted for protecting said element in rough environments without interfering with the application of herbicide or insectide.

2. The invention of claim 1 wherein said handle section has a removable cap on the end thereof to enable filling of said liquid reservoir conduit means.

3. The invention of claim 1 wherein said rope-like element has knots tied in the ends thereof within said discharge ports to provide additional wicking surface area.

* * * * *